US009296909B2

(12) United States Patent
Zhou et al.

(10) Patent No.: US 9,296,909 B2
(45) Date of Patent: Mar. 29, 2016

(54) INK FOR DIRECT INKJET PRINTING TO PLATE BASED ON NANOMETER MATERIAL AND METHOD FOR PREPARING THE SAME

(75) Inventors: Haihua Zhou, Beijing (CN); Minxuan Kuang, Beijing (CN); Yanlin Song, Beijing (CN)

(73) Assignee: Institute of Chemistry, Chinese Academy of Sciences, Beijing (CN)

(*) Notice: Subject to any disclaimer, the term of this patent is extended or adjusted under 35 U.S.C. 154(b) by 2 days.

(21) Appl. No.: 14/123,508

(22) PCT Filed: Jun. 1, 2012

(86) PCT No.: PCT/CN2012/076376
§ 371 (c)(1),
(2), (4) Date: Apr. 28, 2014

(87) PCT Pub. No.: WO2012/163288
PCT Pub. Date: Dec. 6, 2012

(65) Prior Publication Data
US 2014/0296382 A1 Oct. 2, 2014

(30) Foreign Application Priority Data
Jun. 2, 2011 (CN) .......................... 2011 1 0147573

(51) Int. Cl.
C09D 11/10 (2014.01)
C09D 11/328 (2014.01)
C09D 11/106 (2014.01)

(52) U.S. Cl.
CPC ............ *C09D 11/328* (2013.01); *C09D 11/106* (2013.01)

(58) Field of Classification Search
None
See application file for complete search history.

(56) References Cited

U.S. PATENT DOCUMENTS

| 4,168,254 | A | 9/1979 | Fell |
| 5,139,574 | A | 8/1992 | Winnik et al. |
| 5,658,376 | A | 8/1997 | Noguchi et al. |
| 6,214,963 | B1 | 4/2001 | Noguchi et al. |
| 7,950,794 | B2 * | 5/2011 | Vanini .......................... 347/100 |
| 8,394,185 | B2 * | 3/2013 | Ezaki et al. ................. 106/31.25 |

| 2001/0001103 | A1 | 5/2001 | Noguchi et al. |
| 2008/0171149 | A1 | 7/2008 | Hastie |
| 2008/0277626 | A1 | 11/2008 | Yang et al. |

FOREIGN PATENT DOCUMENTS

| CN | 1800982 | A | | 7/2006 |
| CN | 101081952 | B | | 12/2007 |
| CN | 101747683 | A | * | 6/2010 |
| CN | 102002281 | A | | 4/2011 |
| CN | 102031039 | A | | 4/2011 |
| CN | 102040887 | A | | 5/2011 |
| CN | 102076792 | A | | 5/2011 |
| CN | 102134421 | A | | 7/2011 |
| CN | 102807783 | A | | 12/2012 |
| EP | 0025075 | A1 | | 3/1981 |
| EP | 0659038 | A2 | | 6/1995 |
| EP | 1158029 | A1 | | 11/2001 |
| EP | 2042304 | A1 | | 4/2009 |
| JP | A-H08-209048 | | | 8/1996 |
| JP | A-H08-333538 | | | 12/1996 |
| JP | A-H09-291235 | | | 11/1997 |
| JP | A-H10-168151 | | | 6/1998 |
| JP | A-H11-209669 | | | 8/1999 |
| JP | 2002069346 | | | 3/2008 |
| WO | WO 01/34394 | A1 | | 5/2001 |
| WO | WO 2009/124325 | A1 | | 10/2009 |

OTHER PUBLICATIONS

Machine translation of CN 102031039 A to Kuang et al. (published Apr. 27, 2011).*
PCT International Search Report for PCT Counterpart Application No. PCT/CN2012/076376, 10 pgs., (Sep. 13, 2012).

* cited by examiner

Primary Examiner — Vu A Nguyen
(74) Attorney, Agent, or Firm — Blakely, Sokoloff, Taylor & Zafman LLP

(57) ABSTRACT

An ink used for direct inkjet printing to plate based on nanometer material and a method for preparing same. Of the baseline total amount of the ink, 5 to 30 wt % is of film-forming resin, 0.01 to 5 wt % is of nanometer or micrometer dye, 30 to 60 wt % is of organic solvent, 0.01 to 5 wt % is of humectant, and water provides the balance; these ingredients are stirred and mixed at room temperature, and after the film-forming resin is completely dissolved, impurities and/or insoluble substances in the present invention are removed by means of multi-level filtering, and the obtained filtrate is the present ink. The ink in the present invention is sprayed on a metal base material surface by an inkjet printer to form a printing pattern which, after curing, can be directly printed on the machine, thus reducing chemical pollution and post-processing processes, while a press run of the printing plate can be up to 100,000 copies at a resolution of up to 175 lpi.

14 Claims, No Drawings

INK FOR DIRECT INKJET PRINTING TO PLATE BASED ON NANOMETER MATERIAL AND METHOD FOR PREPARING THE SAME

CROSS-REFERENCE TO RELATED APPLICATIONS

This patent application is a U.S. National Phase Application under 35 U.S.C. §371 of International Application No. PCT/CN2012/076376, filed Jun. 1, 2012, entitled INK FOR DIRECT PLATEMAKING OF NANOMETER MATERIAL PRINTING AND METHOD FOR PREPARING SAME, which claims priority to Chinese Patent Application No. 201110147573.3, filed Jun. 2, 2011.

FIELD OF THE INVENTION

The present invention belongs to an ink for printing to plate, and relates to a material for nanometer material-based direct inkjet printing to plate, in particular to an ink for direct inkjet printing to plate based on nanometer material and a method for preparing the same.

BACKGROUND OF THE INVENTION

In the digital imaging field, inkjet printing technique, which is an important branch of conventional printing technology, is receiving more and more attention. The process of direct inkjet printing to plate based on nanometer material includes image and text information is processed firstly and then transferred from a computer to an inkjet printer (plate making machine); the inkjet printer prints the image and text information on an aluminum substrate that is coated with a coating layer or only has grain without coating layer, wherein, the part with images and text is formed by a nanometer composite transfer printing material and is oleophylic, while the part without images and text is hydrophilic; thus, the image and text information is transferred as a result of contrast between the oleophylic part and the hydrophilic part.

Direct inkjet printing to plate based on nanometer material utilizes an inkjet printer (plate making machine) to spray plate making ink on the surface of a substrate to form oleophylic image and text areas; whereas the areas that are not sprayed with ink are hydrophilic areas without images and text; thus, the printing is realized by the contrast between the oleophylic image and text areas and the hydrophilic areas without images and text. Direct inkjet printing to plate based on nanometer material avoids post-treatment procedures such as exposure and development, etc., and the obtained printing plates are proved as having high resolution and high durability. Presently, light solvents and water-based plate making ink are available for direct inkjet printing to plate based on nanometer material; however, the ink droplets diffuse on the surface of the substrate during printing, resulting in degraded plate making accuracy. The present invention aims to effectively inhibit the diffusing behavior of ink droplets by adjusting the formulation of ink, so as to improve the accuracy of plate making and the quality of prints.

SUMMARY OF THE INVENTION

An object of the present invention is to provide an ink for direct inkjet printing to plate based on nanometer material, which can improve the accuracy of plate making and the quality of prints.

Another object of the present invention is to provide a method for preparing the ink for direct inkjet printing to plate based on nanometer material.

According to the ink for direct inkjet printing to plate based on nanometer material of the present application, on the basis of the total weight of the ink, the ink comprises:

| | |
|---|---|
| film-forming resin | 5-30 wt % |
| nanometer or micrometer dye | 0.01-5 wt % |
| organic solvent | 30-60 wt % |
| humectant | 0.01-5 wt % |
| water | balance amount | the film forming resin is at least one selected from the group consisting of phenolic resin, epoxy resin, polyurethane resin, olefinic resin, and cyanate ester resin.

The phenolic resin can be any ordinary phenolic resin. Preferably, the phenolic resin is thermoplastic phenolic resin (i.e. novolac resin).

The epoxy resin can be any ordinary epoxy resin in the art, and there is no special restriction on it. For example, the epoxy resin can be at least one selected from the group consisting of glycidyl ether epoxy resin, glycidyl ester epoxy resin, glycidyl amine epoxy resin, linear aliphatic epoxy resin, and cycloaliphatic epoxy resin.

The polyurethane resin can be selected from resins obtained by condensation of isocyanate and hydroxyl-containing compound in the art, wherein, the isocyanate and hydroxyl-containing compound can be a conventional choice in the art, and there is no special restriction on them. For example, the isocyanate can be at least one selected from the group consisting of toluene diisocyanate, isophorone diisocyanate, para-phenylene diisocyanate, methyl cyclohexyl diisocyanate, and 1,4-cyclohexane diisocyanate. The hydroxyl-containing compound can be at least one selected from the group consisting of polycarbonate diol, polyether triol, polyether diol (e.g., polyoxypropylene glycol, polyoxybutylene glycol, polypropylene glycol, and polyethylene glycol), polyester diol and polyacrylate polyol.

The olefinic resin can be at least one selected from the group consisting of acrylic resin, methacrylic resin, polyhydroxystyrene resin, polyvinyl butyral resin, vinyl chloride-vinyl acetate copolymer resin, vinylidene chloride-vinyl chloride copolymer resin, chlorosulfonated polyethylene resin, and chlorinated polypropylene resin.

The cyanate resin can be at least one selected from the group consisting of bisphenol-A cyanate resin, dicyclopentadiene bisphenol cyanate, or polydiisocyanate resin.

The nanometer or micrometer dye has a particle size of 10-3,000 nm

The dye is any one selected from acid dye, reactive dye, and basic dye.

The acid dye is dye acid blue 9, dye acid blue 9 SF, or dye acid yellow 23 SF. The reactive dye is black dye SP or reactive black. The basic dye is a blue dye, which is basic brilliant blue, crystal violet, or Victoria blue.

The organic solvent is at least one selected from the group consisting of alcohol-based solvent, ester-based solvent, and alcohol ether-based solvent.

The alcohol-based solvent is at least one selected from the group consisting of ethanol, n-propanol, isopropanol, n-butanol, isobutanol, tert-butanol, ethylene glycol, and butylene glycol.

The ester-based solvent is at least one selected from the group consisting of methyl formate, ethyl formate, methyl acetate, ethyl acetate, butyl acetate, ethyl lactate, dimethyl carbonate, propylene carbonate, and propylene glycol monomethyl ether acetate.

The alcohol ether-based solvent is at least one selected from the group consisting of ethylene glycol monomethyl ether, ethylene glycol monoethyl ether, ethylene glycol butyl ether (e.g., ethylene glycol monobutyl ether, ethylene glycol dibutyl ether), ethylene glycol dimethyl ether, ethylene glycol diethyl ether, propylene glycol monomethyl ether, propylene glycol monoethyl ether, propylene glycol dimethyl ether, and propylene glycol diethyl ether.

The humectant is at least one selected from the group consisting of glycerol, propylene glycol, polyethylene glycol, xylitol, polypropylene glycol, hexylene glycol, sorbitol, and amino acid.

In the present invention, the water can be a conventional choice in the art, and is preferably deionized water with conductivity less than 10 microsiemens/cm.

The method for preparing the ink for nano-print to plate of the present invention comprises the following steps: on the basis of the total weight of the ink, film-forming resin in an amount of 5-30 wt %, nanometer or micrometer dye in an amount of 0.01-5 wt %, organic solvent in an amount of 30-60 wt %, humectant in an amount of 0.01-5 wt %, and water in balance amount are mixed at room temperature (e.g., 18-35° C.) with stirring (preferably for 2-6 h), after the film forming resin is dissolved completely, the mixed solution is filtered by multi-stage filtering, to obtain a filtrate, which is the ink for direct inkjet printing to plate based on nanometer material of the present invention.

The multi-stage filtering is preferably carried out by filtering the mixed solution with sand core funnel and filter membrane with micrometer pore size in sequence. Specifically, the mixed solution is filtered with sand core funnel to remove impurities and/or undissolved substances, and then is filtered with filter membranes with micrometer pore size to remove smaller impurities and/or undissolved substances to obtain a filtrate, which is the ink of the present invention.

The filtering with sand core funnels is carried out preferably by filtering with a glass sand core funnel with a pore size of 20-30 μm (G1 type glass sand core funnel) first, and then filtering with a glass sand core funnel with a pore size of 3-4 μm (G4 type glass sand core funnel).

The filtering with filter membranes with micrometer pore size is preferably carried out by filtering with a polytetrafluoroethene micro-pore filter membrane with a pore size of 0.45 μm first, and then filtering with a polytetrafluoroethene micro-pore filter membrane with a pore size of 0.22 μm.

The ink for direct inkjet printing to plate based on nanometer material of the present invention can be printed to surface of a metal substrate through a inkjet printer controlled by a computer (e.g., CTP7600 plate making system (see CN1800982A)) to form image and text areas; then, the metal substrate is cured to form a printing plate that can be used in a printing machine. The printing plate has high durability (up to 100,000 copies). Furthermore, the image and text of the produced prints have a high resolution, wherein the dot reproducibility can be up to 98% or higher, and the resolution can be higher than 175 lpi. At the same time, the post-treatment procedures that may produce chemical pollution are avoided.

According to the present invention, the cure can be any curing mode commonly used in the art, as long as the ink can be transformed from liquid state to solid state. For example, the cure can be photocure or thermal cure. In addition, there is no special restriction on the condition of the cure, which can be selected normally according to the cure mode and the composition of the ink. Therefore, the condition of the cure will not be described in detail herein.

DETAILED DESCRIPTION OF THE EMBODIMENTS

Example 1

On the basis of the total weight of ink, 30 wt % thermoplastic phenolic resin (Model 2123, procured from Liaoning Xinggang Friction Materials Co., Ltd.), 60 wt % tert-butanol, 0.01 wt % propylene glycol, 5 wt % dye acid blue 9 (particle size: 2,000 nm), and deionized water in balance amount are mixed at room temperature for 5 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 3-4 μm first, and then filtering with a polytetrafluoroethene micropore filter membrane with pore size of 0.45 μm.

Example 2

On the basis of the total weight of ink, 5 wt % thermoplastic phenolic resin (Model 2123, procured from Liaoning Xinggang Friction Materials Co., Ltd.), 30 wt % tert-butanol, 0.01 wt % propylene glycol, 0.01 wt % black dye SP (particle size: 2,000 nm), and deionized water in balance amount are mixed at room temperature for 6 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 3-4 μm first, and then filtering with a polytetrafluoroethene micropore filter membrane with pore size of 0.45 μm.

Example 3

On the basis of the total weight of ink, 15 wt % thermoplastic phenolic resin (Model 2402, procured from Qingdao Dechen Chemical Co., Ltd. in Shandong), 50 wt % tert-butanol, 0.2 wt % propylene glycol, 0.5 wt % black dye SP (particle size: 1,000 nm), and deionized water in balance amount are mixed at room temperature for 4 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 3-4 μm first, and then filtering with a polytetrafluoroethene micropore filter membrane with pore size of 0.45 μm.

Example 4

On the basis of the total weight of ink, 5 wt % epoxy resin (Model 815, procured from Borui Resin Material Trading Firm, Sanxiang, Zhongshan, Guangdong), 30 wt % isopropanol, 5 wt % glycerol, 0.01 wt % black dye SP (particle size: 3,000 nm), and deionized water in balance amount are mixed at room temperature for 6 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 3-4 μm first, and then filtering with a polytetrafluoroethene micropore filter membrane with pore size of 0.45 μm.

Example 5

On the basis of the total weight of ink, 15 wt % polyurethane (Model 100, procured from Sanlian Filtering Materials Co., Ltd., Anping, Hebei), 50 wt % dimethyl carbonate, 0.02 wt % xylitol, 0.03 wt % crystal violet (particle size: 10 nm), and deionized water in balance amount are mixed at room temperature for 3 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 3-4 μm first, and then filtering with a polytetrafluoroethene micropore filter membrane with pore size of 0.45 μm.

Example 6

On the basis of the total weight of ink, 20 wt % cyanate resin (Model JQ-5E, procured from Hongshan Chemical Co., Ltd., Liaoning), 40 wt % ethanol, 0.03 wt % polyethylene glycol (Model PEG-600, procured from Sixin Interface Agent Technology Co., Ltd., Jiangsu), 5 wt % reactive black (particle size: 30 nm), and deionized water in balance amount are mixed at room temperature for 4 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm, and then filtering with a polytetrafluoroethene micro-pore filter membrane with pore size of 0.22 μm.

Example 7

On the basis of the total weight of ink, 25 wt % acrylic resin (Model AR-2070, procured from Hanguang Paint Co., Ltd., Changzhou, Jiangsu), 30 wt % ethyl acetate, 20 wt % butyl acetate, 0.02 wt % polypropylene glycol (Model PPG-400, procured from Sixin Interface Agent Technology Co., Ltd., Jiangsu), 1 wt % Victoria blue (particle size: 100 nm), and deionized water in balance amount are mixed at room temperature for 3 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm.

Example 8

On the basis of the total weight of ink, 18 wt % methacrylic resin (Model BC-201-805, procured from Yuanxiang Chemical Co., Ltd., Jinan, Shandong), 52 wt % propylene glycol monomethyl ether acetate, 0.04 wt % hexylene glycol, 1 wt % dye acid yellow 23 SF (particle size: 1,000 nm), and deionized water in balance amount are mixed at room temperature for 2 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm.

Example 9

On the basis of the total weight of ink, 30 wt % polyhydroxystyrene resin (number-average molecular weight: 2,000), 60 wt % propylene glycol monomethyl ether, 5 wt % sorbitol, 4 wt % basic brilliant blue (particle size: 2,000 nm), and deionized water in balance amount are mixed at room temperature for 5 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm, and then filtering with a polytetrafluoroethene micro-pore filter membrane with pore size of 0.22 μm.

Example 10

On the basis of the total weight of ink, 26 wt % polyvinyl butyral resin (procured from Beijing Chemical Reagents Co., Ltd., viscosity at 25° C.: 100 s), 54 wt % propylene glycol monomethyl ether, 3 wt % polypropylene glycol (Model PPG-600, procured from Sixin Interface Agent Technology Co., Ltd., Jiangsu), 2 wt % dye acid blue 9 SF (particle size: 500 nm), and deionized water in balance amount are mixed at room temperature for 4 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm.

Example 11

On the basis of the total weight of ink, 30 wt % vinyl chloride-vinyl acetate copolymer resin (procured from Wuhan Fude Biologic & Chemical Co., Ltd.), 60 wt % ethyl lactate, 5 wt % polyethylene glycol (Model PEG-800, procured from Sixin Interface Agent Technology Co., Ltd., Jiangsu), 2 wt % black dye SP (particle size: 3,000 nm), and deionized water in balance amount are mixed at room temperature for 4 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm, and then filtering with a polytetrafluoroethene micro-pore filter membrane with pore size of 0.22 μm.

Example 12

On the basis of the total weight of ink, 25 wt % vinylidene chloride-vinyl chloride copolymer resin (procured from Wuhan Fude Biologic & Chemical Co., Ltd., Hubei), 55 wt % propylene carbonate, 3 wt % glycerol, 1 wt % black dye SP (particle size: 2,000 nm), and deionized water in balance amount are mixed at room temperature for 3 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm, and then filtering with a polytetrafluoroethene micro-pore filter membrane with pore size of 0.22 μm.

Example 13

On the basis of the total weight of ink, 26 wt % chlorosulfonated polyethylene resin (procured from Longyun Chemical Co., Ltd., Jilin city, Jilin), 44 wt % ethyl formate, 4 wt % xylitol, 2 wt % acid blue 9 (particle size: 800 nm), and deionized water in balance amount are mixed at room temperature for 4 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm, and then filtering with a polytetrafluoroethene micro-pore filter membrane with pore size of 0.22 μm.

Example 14

On the basis of the total weight of ink, 20 wt % chlorinated polypropylene resin (Model EVA, procured from Suxing Chemical Co., Ltd., Guangzhou), 60 wt % propylene glycol dimethyl ether, 0.03 wt % hexylene glycol, 0.03 wt % black dye SP (particle size: 900 nm), and deionized water in balance amount are mixed at room temperature for 5 h. The mixed solution is filtered with sand core funnel and micro-pore filter membrane in sequence to remove undissolved particles and impurities, to obtain a filtrate, which is the ink for direct inkjet printing to plate based on nanometer material.

The filtering of the mixed solution with sand core funnel and micro-pore filter membrane in sequence is carried out by filtering with a glass sand core funnel with pore size of 20-30 μm first, and then filtering with a glass sand core funnel with pore size of 3-4 μm; next, filtering with a polytetrafluoroethene micro-pore filter membrane with pore size of 0.45 μm, and then filtering with a polytetrafluoroethene micro-pore filter membrane with pore size of 0.22 μm.

The deionized water described in above Examples 1-14 has a conductivity less than 10 microsiemens/cm. The inks for direct inkjet printing to plate based on nanometer material obtained in above Examples 1-14 are used respectively in an inkjet printer to print on an aluminum substrate, zinc substrate or copper substrate with nanometer and micrometer structures; then, the aluminum substrates, zinc substrates, or copper substrates sprayed with the inks are thermally cured (at a temperature of 80-150° C. for 0.5-2 h) respectively; next, the cured aluminum substrates, zinc substrates, or copper substrates are tested in printing machines respectively. As proved in the tests, the printing plates have high printing adaptability and high printing durability up to 100,000 copies, and the image resolution is up to 175 lpi.

What is claimed is:

1. An ink for direct inkjet printing to plate based on nanometer material, characterized in that the ink is a filtrate of a mixed solution of a composition, on the basis of the total weight of the composition, the composition consisting of:

| | |
|---|---|
| film-forming resin | 5-30 wt % |
| nanometer or micrometer dye | 0.01-5 wt % |
| organic solvent | 30-60 wt % |
| humectant | 0.01-5 wt % |
| water | balance amount | the film-forming resin is a single one resin selected from the group consisting of thermoplastic phenolic resin, epoxy resin, polyurethane resin, acrylic resin, methacrylic resin, polyhydroxystyrene resin, polyvinyl butyral resin, vinyl chloride-vinyl acetate copolymer resin, vinylidene chloride-vinyl chloride copolymer resin, chlorosulfonated polyethylene resin, chlorinated polypropylene resin, and cyanate resin; and the organic solvent is at least one selected from the group consisting of alcohol-based solvent, ester-based solvent, and alcohol ether-based solvent.

2. The ink for direct inkjet printing to plate based on nanometer material according to claim 1, wherein the nanometer or micrometer dye has a particle size of 10-3,000 nm.

3. The ink for direct inkjet printing to plate based on nanometer material according to claim 1, wherein the dye is any one selected from acid dye, reactive dye, and basic dye.

4. The ink for direct inkjet printing to plate based on nanometer material according to claim 3, wherein the acid dye is dye acid blue 9, dye acid blue 9 SF, or dye acid yellow 23 SF;

the reactive dye is black dye SP or reactive black;

the basic dye is a blue dye, which is basic brilliant blue, crystal violet, or Victoria blue.

5. The ink for direct inkjet printing to plate based on nanometer material according to claim 1, wherein the alcohol-based solvent is at least one selected from the group consisting of ethanol, n-propanol, isopropanol, n-butanol, isobutanol, tert-butanol, ethylene glycol, and butylene glycol;
the ester-based solvent is at least one selected from the group consisting of methyl formate, ethyl formate, methyl acetate, ethyl acetate, butyl acetate, ethyl lactate, dimethyl carbonate, propylene carbonate, and propylene glycol monomethyl ether acetate;
the alcohol ether-based solvent is at least one selected from the group consisting of ethylene glycol monomethyl ether, ethylene glycol monoethyl ether, ethylene glycol butyl ether, ethylene glycol dimethyl ether, ethylene glycol diethyl ether, propylene glycol monomethyl ether, propylene glycol monoethyl ether, propylene glycol dimethyl ether, and propylene glycol diethyl ether.

6. The ink for direct inkjet printing to plate based on nanometer material according to claim 1, wherein the humectant is at least one selected from the group consisting of glycerol, propylene glycol, polyethylene glycol, xylitol, polypropylene glycol, hexylene glycol, sorbitol, and amino acid.

7. A method for preparing an ink for direct inkjet printing to plate based on nanometer material, wherein the method comprises the following steps:
on the basis of total weight of the film-forming resin in an amount of 5-30 wt %, nanometer or micrometer dye in an amount of 0.01-5 wt %, organic solvent in an amount of 30-60 wt %, humectant in an amount of 0.01-5 wt %, and water in balance amount are mixed at room temperature with stirring, after the film forming resin is dissolved completely, the mixed solution is filtered by multi-stage filtering, to obtain a filtrate, which is the ink for direct inkjet printing to plate based on nanometer material, the film-forming resin is single one resin selected from the group consisting thermoplastic of phenolic resin, epoxy resin, polyurethane resin, acrylic resin, methacrylic resin, polyhydroxystyrene resin, polyvinyl butyral resin, vinyl chloride-vinyl acetate copolymer resin, vinylidene chloride-vinyl chloride copolymer resin, chlorosulfonated polyethylene resin, chlorinated polypropylene resin, and cyanate resin; and
the organic solvent is at least one selected from the group consisting of alcohol-based solvent, ester-based solvent, and alcohol ether-based solvent.

8. The method according to claim 7, wherein the multi-stage filtering is carried out by filtering the mixed solution with sand core funnel and filter membrane with micrometer pore size in sequence.

9. The ink for direct inkjet printing to plate based on nanometer material according to claim 2, wherein the dye is any one selected from acid dye, reactive dye, and basic dye.

10. The method according to claim 7, wherein the nanometer or micrometer dye has a particle size of 10-3,000 nm.

11. The method according to claim 7, wherein the dye is any one selected from acid dye, reactive dye, and basic dye.

12. The method according to claim 11, wherein the acid dye is dye acid blue 9, dye acid blue 9 SF, or dye acid yellow 23 SF;
the reactive dye is black dye SP or reactive black;
the basic dye is a blue dye, which is basic brilliant blue, crystal violet, or Victoria blue.

13. The method according to claim 7, wherein the alcohol-based solvent is at least one selected from the group consisting of ethanol, n-propanol, isopropanol, n-butanol, isobutanol, tert-butanol, ethylene glycol, and butylene glycol;
the ester-based solvent is at least one selected from the group consisting of methyl formate, ethyl formate, methyl acetate, ethyl acetate, butyl acetate, ethyl lactate, dimethyl carbonate, propylene carbonate, and propylene glycol monomethyl ether acetate;
the alcohol ether-based solvent is at least one selected from the group consisting of ethylene glycol monomethyl ether, ethylene glycol monoethyl ether, ethylene glycol butyl ether, ethylene glycol dimethyl ether, ethylene glycol diethyl ether, propylene glycol monomethyl ether, propylene glycol monoethyl ether, propylene glycol dimethyl ether, and propylene glycol diethyl ether.

14. The method according to claim 7, wherein the humectant is at least one selected from the group consisting of glycerol, propylene glycol, polyethylene glycol, xylitol, polypropylene glycol, hexylene glycol, sorbitol, and amino acid.

* * * * *